United States Patent
Ding et al.

(10) Patent No.: US 11,797,251 B2
(45) Date of Patent: Oct. 24, 2023

(54) METHOD AND APPARATUS FOR IMPLEMENTING CONTENT DISPLAYING OF COMPONENT

(71) Applicant: Huawei Device Co., Ltd., Guangdong (CN)

(72) Inventors: Jianxin Ding, Shenzhen (CN); Liping Hu, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 17/834,401

(22) Filed: Jun. 7, 2022

(65) Prior Publication Data

US 2022/0300235 A1   Sep. 22, 2022

Related U.S. Application Data

(63) Continuation of application No. 17/358,653, filed on Jun. 25, 2021, now Pat. No. 11,385,853, which is a continuation of application No. 17/005,682, filed on Aug. 28, 2020, now Pat. No. 11,068,224, which is a continuation of application No. 16/561,769, filed on
(Continued)

(30) Foreign Application Priority Data

Aug. 13, 2012 (CN) .......................... 201210286514.9

(51) Int. Cl.
*G06F 3/14* (2006.01)
*G06F 3/0482* (2013.01)
*G09G 5/14* (2006.01)

(52) U.S. Cl.
CPC .......... *G06F 3/1423* (2013.01); *G06F 3/0482* (2013.01); *G06F 3/14* (2013.01); *G09G 5/14* (2013.01); *G09G 2340/04* (2013.01); *G09G 2340/145* (2013.01); *G09G 2354/00* (2013.01)

(58) Field of Classification Search
None
See application file for complete search history.

(56) References Cited

U.S. PATENT DOCUMENTS 6,501,487 B1 * 12/2002 Taguchi ................ G06F 3/0481
715/788
7,971,155 B1    6/2011 Yoon
(Continued)

FOREIGN PATENT DOCUMENTS

CN   101039473 A   9/2007
CN   101123517 A   2/2008
(Continued)

OTHER PUBLICATIONS

"Resizable widgets," 1.0.173 for Android, Jun. 21, 2017, 1 page.
(Continued)

*Primary Examiner* — Aneeta Yodichkas
(74) *Attorney, Agent, or Firm* — Conley Rose, P.C.

(57) ABSTRACT

A method for content displaying of a component includes displaying, on a terminal screen, a first display interface of a component, acquiring a first display instruction, acquiring a second display interface of the component according to the first display instruction, and displaying, on the terminal screen, the second display interface of the component, where the second display interface includes the first display interface.

20 Claims, 7 Drawing Sheets

Related U.S. Application Data

Sep. 5, 2019, now Pat. No. 10,768,882, which is a continuation of application No. 16/131,504, filed on Sep. 14, 2018, now Pat. No. 10,503,455, which is a continuation of application No. 14/619,340, filed on Feb. 11, 2015, now Pat. No. 10,101,956, which is a continuation of application No. PCT/CN2013/073023, filed on Mar. 22, 2013.

(56) References Cited

U.S. PATENT DOCUMENTS

| | | |
|---|---|---|
| 8,009,179 B2 | 8/2011 | Araki |
| 8,230,361 B2 | 7/2012 | Goldberg et al. |
| 8,549,493 B2 | 10/2013 | Redpath |
| 9,417,759 B1 | 8/2016 | Srinivasan et al. |
| 10,101,956 B2 | 10/2018 | Ding et al. |
| 2007/0174384 A1 | 7/2007 | Abd-El-Malek et al. |
| 2007/0220449 A1 | 9/2007 | Lee |
| 2008/0082941 A1 | 4/2008 | Goldberg et al. |
| 2008/0282179 A1 | 11/2008 | Kim et al. |
| 2008/0304112 A1 | 12/2008 | Matsuno |
| 2009/0125835 A1 | 5/2009 | Vaughan et al. |
| 2009/0249359 A1 | 10/2009 | Caunter |
| 2009/0260022 A1 | 10/2009 | Louch et al. |
| 2010/0001967 A1 | 1/2010 | Yoo |
| 2010/0023858 A1 | 1/2010 | Ryu et al. |
| 2010/0283743 A1 | 11/2010 | Coddington |
| 2010/0299597 A1 | 11/2010 | Shin et al. |
| 2010/0299606 A1 | 11/2010 | Morita |
| 2011/0202878 A1 | 8/2011 | Park et al. |
| 2011/0265040 A1 | 10/2011 | Shin et al. |
| 2011/0271181 A1 | 11/2011 | Tsai et al. |
| 2011/0288913 A1 | 11/2011 | Waylonis et al. |
| 2011/0320939 A1 | 12/2011 | Hand et al. |
| 2012/0064882 A1 | 3/2012 | Kim et al. |
| 2012/0117492 A1 | 5/2012 | Aggarwal et al. |
| 2012/0174058 A1 | 7/2012 | Winker et al. |
| 2013/0066853 A1* | 3/2013 | Andersson .......... G06F 16/9038 707/E17.014 |
| 2013/0198177 A1 | 8/2013 | Oldham et al. |
| 2013/0198643 A1 | 8/2013 | Yang et al. |
| 2013/0219303 A1 | 8/2013 | Eriksson et al. |
| 2013/0321340 A1* | 12/2013 | Seo ..................... G06F 3/04883 345/174 |
| 2013/0346922 A1 | 12/2013 | Shipplacoff et al. |
| 2015/0160909 A1 | 6/2015 | Ding et al. |
| 2015/0188859 A1 | 7/2015 | Li et al. |

FOREIGN PATENT DOCUMENTS

| | | |
|---|---|---|
| CN | 101146278 A | 3/2008 |
| CN | 101286335 A | 10/2008 |
| CN | 101304432 A | 11/2008 |
| CN | 101561748 A | 10/2009 |
| CN | 101661376 A | 3/2010 |
| CN | 102016796 A | 4/2011 |
| CN | 102109945 A | 6/2011 |
| CN | 102184075 A | 9/2011 |
| CN | 102207868 A | 10/2011 |
| CN | 102221932 A | 10/2011 |
| CN | 102411467 A | 4/2012 |
| CN | 102419760 A | 4/2012 |
| CN | 102439861 A | 5/2012 |
| CN | 102541556 A | 7/2012 |
| CN | 102819416 A | 12/2012 |
| JP | 2007025786 A | 2/2007 |
| KR | 20100023891 A | 3/2010 |
| KR | 20100092613 A | 8/2010 |
| KR | 20100124440 A | 11/2010 |
| KR | 20110093554 A | 8/2011 |
| KR | 20120028532 A | 3/2012 |
| WO | 2008146217 | 12/2008 |
| WO | 2009097555 A2 | 8/2009 |
| WO | 2009109657 A1 | 9/2009 |
| WO | 2010134704 A2 | 11/2010 |
| WO | 2011135300 A2 | 11/2011 |

OTHER PUBLICATIONS

"Introducing DejaToday Widgets for Android (DejaOffice 1.10, part 1)," CompanionLink Blog, Feb. 28, 2011, 5 pages.

Johnson, J., "Five Slick Menu Bar Apps For Controlling Itunes," appstorm, Feb. 9, 2012, 17 pages.

Whitwam, R., "Winamp vs PowerAMP: Which is the Best Android Music Player?," Tested, Dec. 1, 2010, 13 pages.

Youtube "Samsung Galaxy S || Spotlight Resizing Resizable Widgets," Sep. 25, 2011, 4 pages.

"How To Use," Fandom, Yahoo! Media Player, Jun. 22, 2017, 2 pages.

Wong, J., "3 Different Ways To Embed A Free MP3 Player on Your Website," MUD, Jan. 18, 2011, 10 pages.

Palinko, S., et al., et al., "Zoomable News: Zoom and Animation-Based News Browsing for the Web," Published 2007, Semantic Scholar, 6 pages.

Bederson, B., et al., "A Zooming Web Browser," Aug. 14, 2002, University of New Mexico, 12 pages.

* cited by examiner

METHOD AND APPARATUS FOR IMPLEMENTING CONTENT DISPLAYING OF COMPONENT

CROSS-REFERENCE TO RELATED APPLICATIONS

This is a continuation of U.S. patent application Ser. No. 17/358,653 filed on Jun. 25, 2021, which is a continuation of U.S. patent application Ser. No. 17/005,682 filed on Aug. 28, 2020, now U.S. Pat. No. 11,068,224, which is a continuation of U.S. patent application Ser. No. 16/561,769 filed on Sep. 5, 2019, now U.S. Pat. No. 10,768,882, which is a continuation of U.S. patent application Ser. No. 16/131,504 filed on Sep. 14, 2018, now U.S. Pat. No. 10,503,455, which is a continuation of U.S. patent application Ser. No. 14/619,340 filed on Feb. 11, 2015, now U.S. Pat. No. 10,101,956, which is a continuation of International Patent Application No. PCT/CN2013/073023 filed on Mar. 22, 2013, which claims priority to Chinese Patent Application No. 201210286514.9 filed on Aug. 13, 2012. All of the aforementioned applications are hereby incorporated by reference in their entireties.

TECHNICAL FIELD

The present disclosure relates to the field of mobile Internet technologies, and in particular, to a method and an apparatus for implementing content displaying of a component.

BACKGROUND

With the rapid development of the mobile Internet, a component has become an important technology increasingly indispensable in the field of the mobile Internet. A component is an icon displayed on a home screen and corresponding to an application program, and may be a shortcut icon, or may be a widget. The widget is a small application program platform that can run on a network terminal or a mobile terminal, and is also a network-based plug-in tool that can run on a terminal home screen. A widget can provide information such as weather and news for a terminal user. For example, a clock widget can display current time on a home screen; a weather widget can display weather information of a specific area; and a central processing unit (CPU) widget can display CPU usage of a terminal.

In a running process of a component, the component can be clicked on a terminal home screen, so as to start an application program corresponding to the component and enter a window of the application program. However, after the window of the application program is entered, a whole display screen of a terminal displays only the window of the application program, which significantly reduces interface display utilization.

SUMMARY

Embodiments of the present disclosure provide a method and an apparatus for implementing content displaying of a component, which can effectively improve interface display utilization of a component and improve satisfaction on user experience.

According to a first aspect, a method for implementing content displaying of a component is provided, including displaying, on a terminal screen, a first display interface of a component; acquiring a first display instruction; acquiring a second display interface of the component according to the first display instruction; and displaying, on the terminal screen, the second display interface of the component, where the second display interface includes the first display interface.

In a first possible implementation manner, the acquiring a second display interface of the component according to the first display instruction specifically includes acquiring the second display interface of the component from a terminal locally according to the first display instruction; or acquiring the second display interface of the component by using a network and according to the first display instruction.

With reference to the first aspect or the first possible implementation manner of the first aspect, in a second possible implementation manner, the method further includes acquiring a second display instruction; and according to the second display instruction, displaying the first display interface and hiding an interface of the component except the first display interface.

With reference to the first aspect, the first possible implementation manner of the first aspect, or the second possible implementation manner of the first aspect, in a third possible implementation manner, the component includes a shortcut icon shortcut or a widget.

With reference to the third possible implementation manner of the first aspect, in a fourth possible implementation manner, the first display interface of the component at least includes summary information of an application corresponding to the component.

With reference to the first aspect or any one of the foregoing implementation manners of the first aspect, in a fifth possible implementation manner, the acquiring a first display instruction specifically includes presetting the first display instruction that is used to display the second display interface of the component; presetting a virtual button on the first display interface of the component, and associating the virtual button with the first display instruction; and after external operation information for the virtual button is received, matching and extracting, by using the association relationship, the first display instruction corresponding to the virtual button.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, the acquiring a first display instruction specifically includes presetting the first display instruction that is used to display information of the second display interface of the component; detecting whether there is an external trigger signal on the terminal screen corresponding to the first display interface of the component; and when there are multiple external trigger signals within a preset time on the terminal screen corresponding to the first display interface of the component, invoking the first display instruction that is stored.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a seventh possible implementation manner, the acquiring a first display instruction specifically includes presetting the first display instruction that is used to display information of the second display interface of the component; collecting an external trigger signal of the terminal screen; and determining whether the external trigger signal is generated in a preset region of the terminal screen, and if yes, invoking the first display instruction that is stored.

With reference to the first aspect or any one of the foregoing possible implementation manners, in an eighth possible implementation manner, a terminal screen region corresponding to the second display interface of the widget covers a terminal screen region corresponding to the first display interface of the widget.

According to a second aspect, an apparatus for implementing content displaying of a component is provided, including a displaying unit, an acquiring unit, and a processing unit, where the displaying unit is configured to display, on a terminal screen, a first display interface of a component; the acquiring unit is configured to acquire a first display instruction; and the processing unit is configured to acquire a second display interface of the component according to the first display instruction acquired by the acquiring unit, and instruct the displaying unit to display, on the terminal screen, the second display interface of the component, where the second display interface includes the first display interface.

In a first possible implementation manner, the processing unit includes a first processing module configured to acquire the second display interface of the component from a terminal locally according to the first display instruction; or a second processing module configured to acquire the second display interface of the component by using a network and according to the first display instruction.

With reference to the first aspect or the first possible implementation manner of the first aspect, in a second possible implementation manner, the acquiring unit is further configured to acquire a second display instruction; and the processing unit is further configured to according to the second display instruction, display the first display interface and hide an interface of the component except the first display interface.

With reference to the first aspect or any one of the foregoing possible implementation manners of the first aspect, in a third possible implementation manner, the acquiring unit includes a first setting module, an associating module, and a matching module, where the first setting module is configured to set the first display instruction that is used to display the second display interface of the component, and preset a virtual button on the first display interface of the component; the associating module is configured to associate, with the first display instruction, the virtual button set by the first setting module; and the matching module is configured to after external operation information for the virtual button is received, match and extract, by using the association relationship, the first display instruction corresponding to the virtual button.

With reference to the first aspect, or the first possible implementation manner of the first aspect, or the second possible implementation manner of the first aspect, in a fourth possible implementation manner, the acquiring unit includes a second setting module, a detecting module, and a first invoking module, where the second setting module is configured to set the first display instruction that is used to display the second display interface of the component; the detecting module is configured to detect whether there is an external trigger signal on the terminal screen corresponding to the first display interface of the component, and notify the first invoking module of a detecting result; and the first invoking module is configured to receive the detecting result of the detecting module, and when there are multiple external trigger signals within a preset time on the terminal screen corresponding to the first display interface of the component, invoke the first display instruction.

With reference to the first aspect, or the first possible implementation manner of the first aspect, or the second possible implementation manner of the first aspect, in a fifth possible implementation manner, the acquiring unit includes a third setting module, a collecting module, and a second invoking module, where the third setting module is configured to set the first display instruction that is used to display the second display interface of the component; the collecting module is configured to collect an external trigger signal of the terminal screen and notify the second invoking module of a collecting result; and the second invoking module is configured to receive the collecting result of the collecting module, determine, according to the collecting result, whether the external trigger signal is generated in a preset region of the terminal screen, and if yes, invoke the first display instruction.

It can be seen that, by using the method and apparatus in the embodiments of the present disclosure, multiple kinds of display interfaces are provided for a component, the multiple kinds of display interfaces of the component are displayed layer by layer by acquiring a display instruction, and interface display utilization is also effectively improved by displaying display interfaces, of different levels of detail, of the component layer by layer.

In some approaches, information displayed after an interface of an application program corresponding to a component is entered is not a successive change of information displayed on an original interface of the component; that is, the information displayed after the application program corresponding to the component is entered is detailed information displayed after the interface of the application program is refreshed, there is no successive change relationship between the detailed information and the information displayed on the original interface of the component, and even displayed content of the two is totally different in a special condition. Therefore, after the detailed information is displayed, a user needs to perform searching for the second time to acquire target information, thereby reducing satisfaction on user experience; meanwhile, content displayed on the interface of the component before and after the refreshing is not successively changed, thereby significantly reducing interface display utilization. Each display interface that displays the component every time may include display information of a previous interface, which ensures a successive change of displayed application information of the component, so that when a next interface is displayed, a user does not need to view again information that is viewed on a previous interface, thereby improving user experience.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that a component involved in a method and an apparatus for implementing content displaying of a component in the embodiments of the present disclosure refers to an icon displayed on a home screen and corresponding to an application program, such as a shortcut or a widget, but is not limited thereto.

Figure 1:
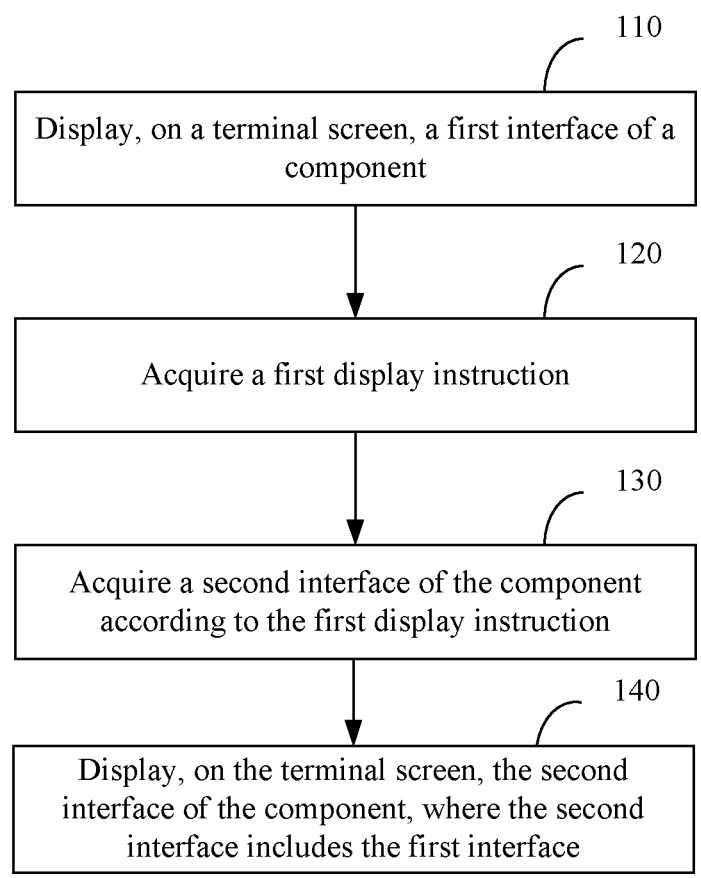
FIG. 1 is a schematic flowchart of a method for implementing content displaying of a component according to an embodiment of the present disclosure.

An embodiment of the present disclosure provides a method for implementing content displaying of a component. As shown in FIG. 1, the method includes the following.

Step 110, display, on a terminal screen, a first display interface of a component.

When a component is displayed on a terminal screen, because multiple shortcuts or multiple widgets need to be displayed on the terminal screen, affected by a size of the terminal screen, all information of an application program corresponding to each component cannot be displayed on the terminal screen. Preferably, summary information of an application program corresponding to the component is displayed on the terminal screen. The summary information of the application program corresponding to the component in this embodiment refers to related information that can indicate main content of the application program of the component, but certainly is not limited thereto. For ease of description, in this embodiment, an original interface on which the component is displayed on the terminal screen is referred to as a first display interface, which is not described in detail again.

Step 120, acquire a first display instruction.

It should be noted that there may be one or more first display instructions. If the component has multiple display interfaces, the multiple display interfaces of the component can be displayed level by level by using the first display instruction for multiple times.

A widget is used as an example, after the widget is displayed on the terminal screen and the first display instruction is received, a second display interface of the widget is acquired according to the first display instruction. Certainly, a person of ordinary skill in the art may easily understand that a display instruction may be acquired in multiple manners in some approaches, and details are not described again in this embodiment. This embodiment provides the following several manners for acquiring a display instruction, but is not limited thereto.

A. Preset the first display instruction that is used to display information of the second display interface of the widget; preset a virtual button on the first display interface of the widget, and associate the virtual button with the first display instruction that is used to display the second display interface; and after external operation information for the virtual button is received, acquire, by using the association relationship, the first display instruction corresponding to the virtual button.

B. Preset the first display instruction that is used to display information of the second display interface of the widget; detect whether there is an external trigger signal on the terminal screen corresponding to the first display interface of the widget; and if there are multiple external trigger signals within a preset time, invoke the first display instruction that is stored, to instruct a subsequent operation.

C. Preset the first display instruction that is used to display information of the second display interface of the widget; collect an external trigger signal of the terminal screen; and determine whether the external trigger signal is generated in a preset region of the terminal screen, and if yes, invoke the first display instruction that is stored, to instruct a subsequent operation.

Step 130, acquire a second display interface of the component according to the first display instruction.

It should be noted that the second display interface of the component may be acquired from a terminal locally according to the first display instruction, and in this case, one or more second display interfaces of the component are stored in the terminal locally, and a corresponding second display interface is acquired according to the number of times that the first display instruction is received; or the second display interface of the component may be acquired by using a network and according to the first display instruction, and in this case, display information of one or more second display interfaces of the component is stored in a server at a network side, the terminal sends an acquiring instruction to the server, the server sends a search result to the terminal, and then the terminal displays the search result. A specific acquiring manner may be implemented by using some approaches, which is not described in detail again in this embodiment.

A music component is used as an example for description in the following. It is assumed that a first display interface of the music component is a music shortcut, which occupies a display range of 1*1 of a screen. After a first display instruction is acquired, a second display interface, that is, a music widget, of the music component, is acquired from the terminal locally, which occupies a display range of 2*2 of the screen and displays a play button and a music name in addition to information displayed on the first display interface. After the first display instruction is acquired again, according to the number of times that the first display instruction is received, a second display interface that is, a music widget, of the music component, is acquired, which occupies a display range of 4*4 of the screen and displays lyrics in addition to information displayed on the second display interface. In this way, a terminal user can display each display interface of a component layer by layer according to a personal requirement, instead of directly displaying an interface of the component, which causes a waste of screen displaying. Therefore, in the embodiment of the present disclosure, interface display utilization is effectively improved. In addition, in the embodiment of the present disclosure, a shortcut and a widget can be switched freely, and a widget also has multiple display interfaces for different content requirements, thereby improving flexibility of displaying a component on a screen and significantly improving user experience.

Step 140, display, on the terminal screen, the second display interface of the component, where the second display interface includes the first display interface. It should be noted that, in the method of this embodiment, in order to avoid losing association between information that is displayed on component interfaces before and after the refreshing, this embodiment proposes that a previous display interface of the component needs to be included in a new interface that is displayed according to a display instruction, so that content displayed before and after the refreshing presents a trend of successive changes.

It should be noted that there may be multiple explanations of that the second display interface includes the first display interface. For example, the explanations may be that a display position of the second display interface includes a display position of the first display interface, which may be that the position of the second display interface superposes with the position of the first display interface, for example, the first display interface is displayed at a position 1 of a screen, and the second display interface is displayed at the position 1 and a position 2 of the screen; or the explanations may be that there is an inclusion relationship between display ranges, for example, the first display interface occupies a range of 1*1 on the screen, and the second display interface occupies a range of 2*2 on the screen; or the explanations may be that there is an inclusion relationship between displayed content, for example, content displayed on the second display interface includes content displayed on the first display interface, that is, the content displayed on the first display interface also exists in the content of the second display interface.

It should be noted that this embodiment is not limited to that different display interfaces of the widget are displayed after being triggered once or twice, which may also be implemented by being triggered for multiple times, and details are not described again in this embodiment. Therefore, in this embodiment, the first display interface of the component and the second display interface of the component may also be specific regions of the terminal screen, and a terminal screen region corresponding to the second display interface of the component can completely cover a terminal screen region corresponding to the first display interface of the component; and when displaying is triggered for multiple times, a terminal screen region corresponding to a new interface of the component needs to completely cover a terminal screen region corresponding to an original interface of the component.

Optionally, the method of this embodiment may further include acquiring a second display instruction; according to the second display instruction, displaying the first display interface and hiding an interface of the component except the first display interface. That is, an original interface of the component may be further displayed according to another received display instruction after the second display interface of the component is displayed. In this way, when there is no need to display a more detailed display interface of the component, a size of the component can be changed easily back to an original size by a user, thereby improving interface display utilization and significantly improving user experience.

It should be further noted that, in a specific implementation process, display instructions may be distinguished by using different gestures. In this case, the first display instruction and the second display instruction are stored in a display instruction table in memory. The display instruction table is preconfigured in the terminal, and content of the display instruction table may be different according to different operations supported by different touchscreen terminals. In this embodiment, the display instruction table mainly includes a mapping relationship between a display instruction and a display interface, but is not limited thereto. In addition to a specific gesture, a user may use a display instruction such as a function button or a menu to send a display instruction; and any manner that can carry an instruction function is available. In a specific implementation process, different regions at which different display instructions act may also be used for distinguishing display instructions. For example, that a display instruction acts at a specific region at the lower right corner of the component indicates that a next display interface of the component is checked, and that a display instruction acts at a specific region at the lower left corner of the component indicates that an original display interface of the component is returned to.

It should be noted that, for a requirement of compatibility, an instruction that is used to instruct a component to enter an application program corresponding to the component may be further set. The instruction may be the same as that in some approaches, which meets a consistency requirement of a user; or a proper instruction may be further designed according to a display instruction in the embodiment of the present disclosure as an instruction that is used to instruct a component to enter an application program corresponding to the component, which is not specifically limited herein.

It can be seen that, by using the method in the embodiment of the present disclosure, multiple kinds of display interfaces are provided for a component, the multiple kinds of display interfaces of the component are displayed layer by layer by acquiring a display instruction, and interface display utilization is also effectively improved by displaying display interfaces, of different levels of detail, of the component layer by layer.

In some approaches, information displayed after an interface of an application program corresponding to a component is entered is not a successive change of information displayed on an original interface of the component; that is, the information displayed after the application program corresponding to the component is entered is detailed information displayed after the interface of the application program is refreshed, there is no successive change relationship between the detailed information and the information displayed on the original interface of the component, and even displayed content of the two is totally different in a special condition. Therefore, after the detailed information is displayed, a user needs to perform searching for the second time to acquire target information, thereby reducing satisfaction on user experience; meanwhile, content displayed on the interface of the component before and after the refreshing is not successively changed, thereby significantly reducing interface display utilization. Each display interface that displays the component every time may include display information of a previous interface, which ensures a successive change of displayed application information of the component, so that when a next interface is displayed, a user does not need to view again information that is viewed on a previous interface, thereby improving user experience.

Figure 2:
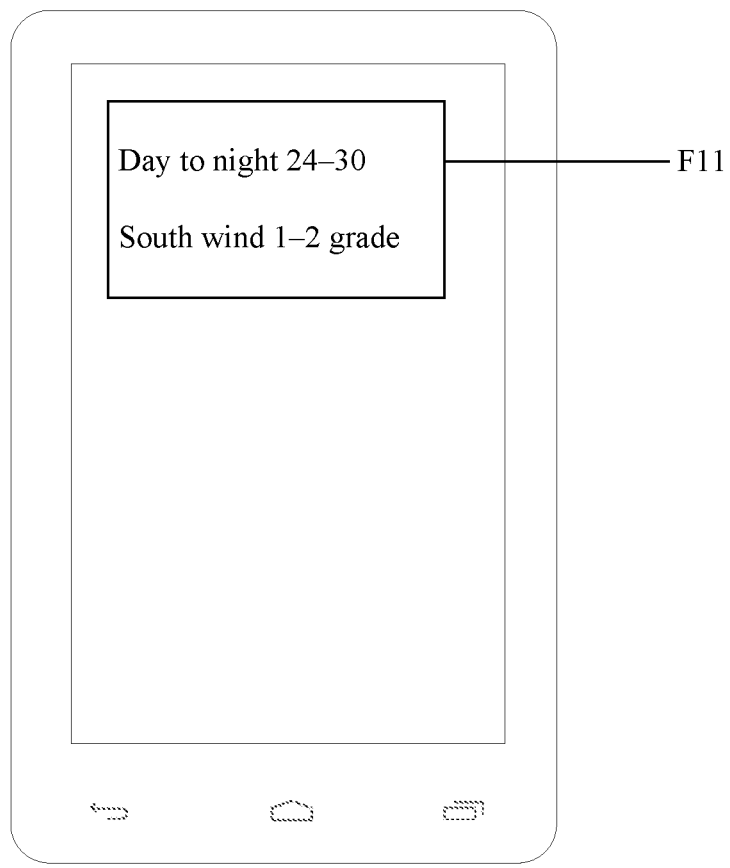
FIG. 2 is a first schematic diagram of implementation of content displaying of a weather component according to an embodiment of the present disclosure.
Figure 3:
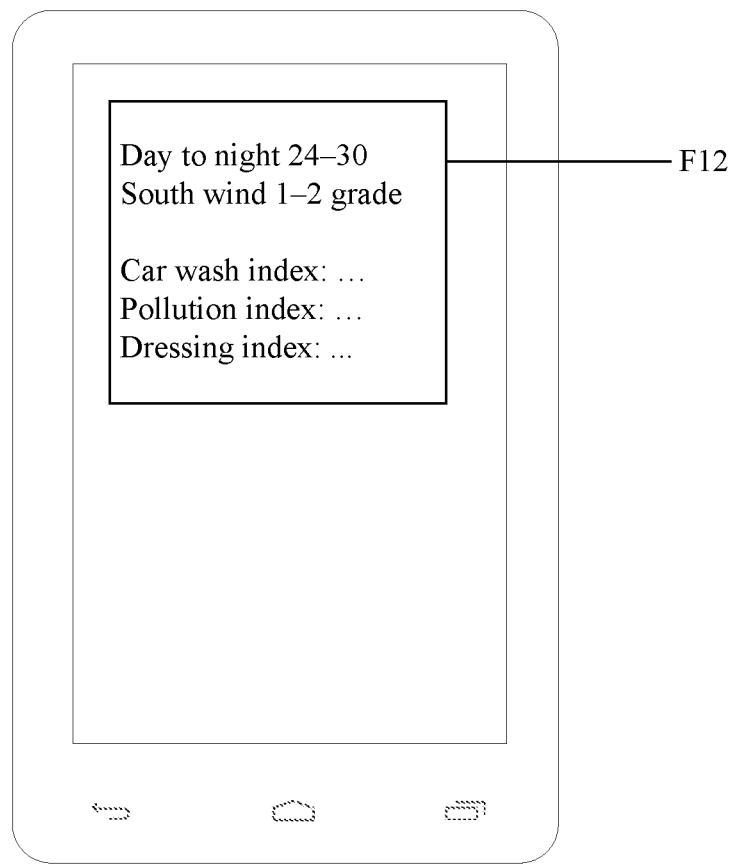
FIG. 3 is a second schematic diagram of implementation of content displaying of a weather component according to an embodiment of the present disclosure.
Figure 4:
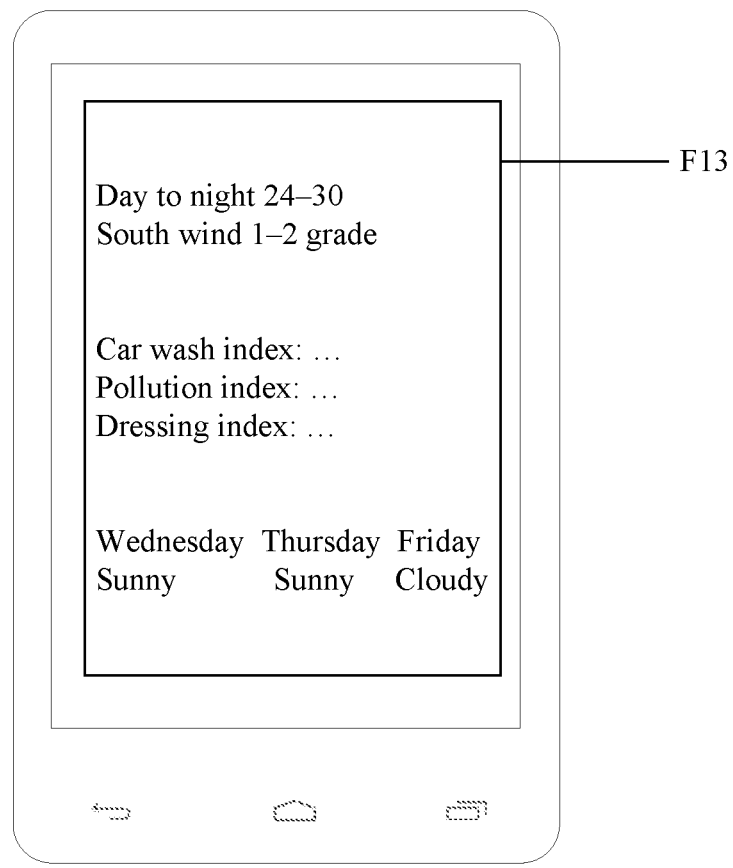
FIG. 4 is a third schematic diagram of implementation of content displaying of a weather component according to an embodiment of the present disclosure.

In the following, a specific weather widget that displays weather information of a specific area is used as an example to describe in detail the method for implementing widget content displaying in the foregoing embodiment. As shown in FIG. 2 to FIG. 4, the method includes the following.

S210, display, on a mobile terminal screen, a first display interface of the weather widget, where a mobile terminal screen region corresponding to the first display interface of the weather widget is the first display interface F11. As shown in FIG. 2, content of the first display interface of the weather widget includes a time, a temperature, a wind direction, wind power, and the like.

S220, collect a tapping trigger signal of the mobile terminal screen, and determine whether the tapping trigger signal is on the first display interface F11; if yes, invoke a first display instruction that is stored, acquire a second display interface F12 according to the first display instruction, and display the content of the first display interface of the weather widget on the second display interface F12. As shown in FIG. 3, content of the second display interface of the weather widget includes a time, a temperature, a wind direction, wind power, a car wash index, a pollution index, a dressing index, and the like.

S230, after the content of the first display interface of the weather widget is displayed on the second display interface F12 of the mobile terminal, determine whether there is a tapping trigger signal on the second display interface F12. If there is a tapping trigger signal on the second display interface F12, invoke a first display instruction that is stored, acquire a second display interface F13 according to the time of the first display instruction, and display content of the second display interface F12 of the weather widget on the second display interface F13. As shown in FIG. 4, content of the second display interface, corresponding to the number of times that the first display instruction is received, of the weather widget includes a time, a temperature, a wind direction, wind power, a car wash index, a pollution index, a dressing index, weather conditions in the following three days, and the like. If there is no tapping trigger signal on the second display interface F12, keep displaying information of the second display interface of the weather widget on a home screen of the mobile terminal.

Figure 5:
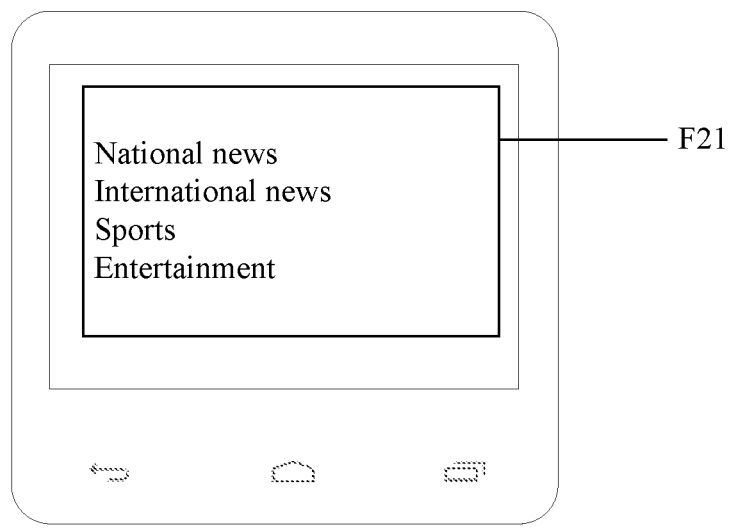
FIG. 5 is a first schematic diagram of implementation of content displaying of a news component according to an embodiment of the present disclosure.
Figure 6:
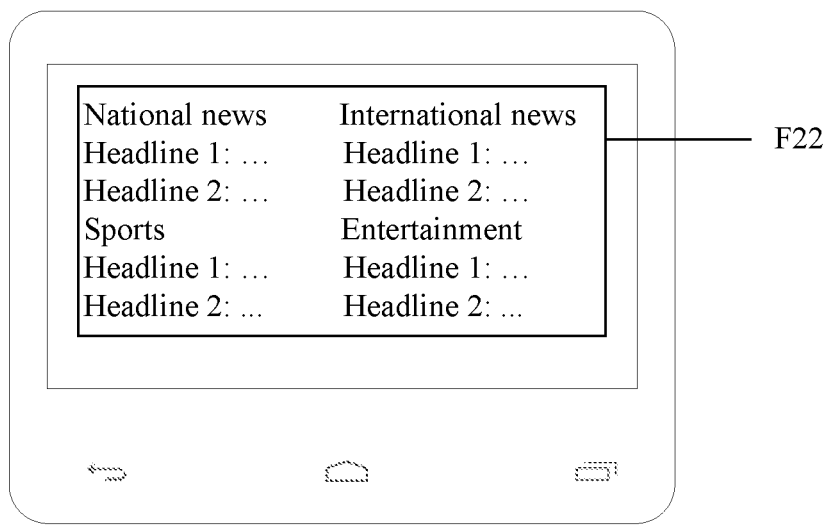
FIG. 6 is a second schematic diagram of implementation of content displaying of a news component according to an embodiment of the present disclosure.
Figure 7:
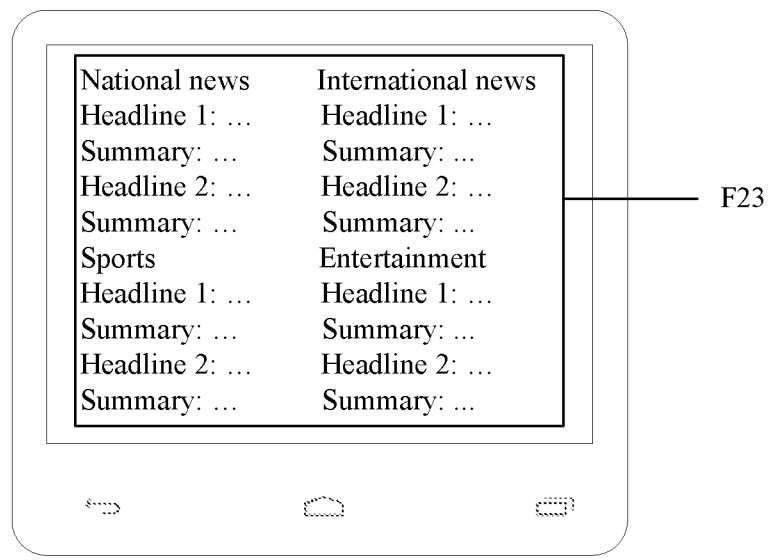
FIG. 7 is a third schematic diagram of implementation of content displaying of a news component according to an embodiment of the present disclosure.

In the following, a specific news widget that displays news information is used as an example to describe in detail the method for implementing widget content displaying in the foregoing embodiment. As shown in FIG. 5 to FIG. 7, the method includes the following.

S310, display, on a mobile terminal screen, a first display interface of the news widget, where a mobile terminal screen region corresponding to the first display interface of the news widget is a first display interface. As shown in FIG. 5, content of the first display interface of the news widget includes national news, international news, sports, entertainment, and the like.

S320, detect whether there is an external tapping trigger signal on the first display interface F21 of the news widget; and if there is an external tapping trigger signal on the first display interface F21 of the news widget, and it is detected within 0.1 second that there are multiple tapping trigger signals on the first display interface F21 of the news widget, invoke a first display instruction that is stored, acquire a second display interface F22 according to the first display instruction, and display information of the first display interface of the news widget in the second display interface F22. As shown in FIG. 6, content of the second display interface of the news widget includes national news, international news, sports, entertainment, main headlines of all kinds of news, and the like.

S330, after the content of the second display interface of the news widget is displayed in the second display interface F22 of the mobile terminal, determine whether there is a tapping trigger signal on the second display interface F22. If there is a tapping trigger signal on the second display interface F22, invoke a first display instruction that is stored, acquire a second display interface F23 according to the time of the first display instruction, and display information of the second display interface F22 of the news widget on the second display interface F23. As shown in FIG. 7, content of the second display interface, corresponding to the number of times that the first display instruction is received, of the news widget includes national news, international news, sports, entertainment, main headlines of all kinds of news, news summary corresponding to each headline, and the like. If there is no tapping trigger signal in the second display interface F22, keep displaying the information of the second display interface of the news widget on a home screen of the mobile terminal.

It can be seen that, by using the method in the embodiment of the present disclosure, multiple kinds of display interfaces are provided for a component, the multiple kinds of display interfaces of the component are displayed layer by layer by acquiring a display instruction, and interface display utilization is also effectively improved by displaying display interfaces, of different levels of detail, of the component layer by layer. Each display interface that displays the component every time may include display information of a previous interface, which ensures a successive change of displayed application information of the component, so that when a next interface is displayed, a user does not need to view again information that is viewed on a previous interface, thereby improving user experience.

It should be noted that the method provided in the embodiment of the present disclosure may also be applied to another function module in which multilevel displaying is needed. For example, a contact module may display frequently-used contact information on a first display interface, such as a phone number that is most frequently used in contact information; and the contact module may display other contact information on a second display interface, such as an email address and a seldom used home telephone number.

Figure 8:
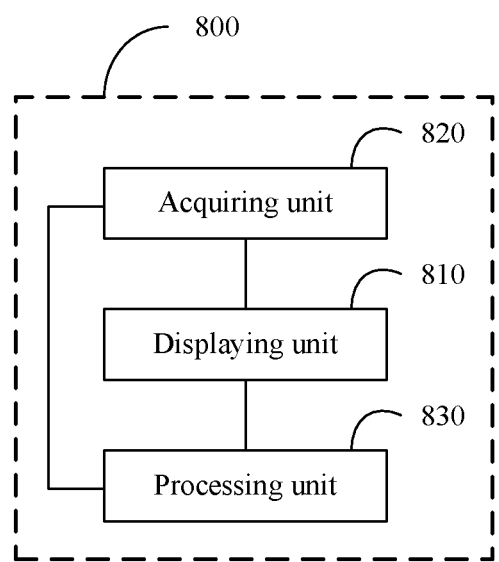
FIG. 8 is a schematic structural diagram of an apparatus for implementing content displaying of a component according to an embodiment of the present disclosure.

Another embodiment of the present disclosure provides an apparatus for implementing content displaying of a component. As shown in FIG. 8, the apparatus 800 includes a displaying unit 810, an acquiring unit 820, and a processing unit 830.

The displaying unit 810 is configured to display, on a terminal screen, a first display interface of a component.

The acquiring unit 820 is configured to acquire a first display instruction. The processing unit 830 is configured to acquire a second display interface of the component according to the first display instruction acquired by the acquiring unit 820, and instruct the displaying unit 810 to display, on the terminal screen, the second display interface of the component, where the second display interface includes the first display interface. It should be noted that there may be one or more first display instructions. If the component has multiple display interfaces, the multiple display interfaces of the component can be displayed level by level by using the first display instruction for multiple times.

It should be noted that there may be multiple explanations of that the second display interface includes the first display interface. For example, the explanations may be that a display position of the second display interface includes a display position of the first display interface, which may be that the position of the second display interface superposes with the position of the first display interface, for example, the first display interface is displayed at a position 1 of a screen, and the second display interface is displayed at the position 1 and a position 2 of the screen; or the explanations may be that there is an inclusion relationship between display ranges, for example, the first display interface occupies a range of 1*1 on the screen, and the second display interface occupies a range of 2*2 on the screen; or the explanations may be that there is an inclusion relationship between displayed content, for example, content displayed on the second display interface includes content displayed on the first display interface, that is, the content displayed on the first display interface also exists in the content of the second display interface.

The processing unit 830 may further include (not shown in the figure) a first processing module configured to acquire the second display interface of the component from a terminal locally according to the first display instruction; or a second processing module configured to acquire the second display interface of the component by using a network and according to the first display instruction. It should be noted that the first processing module may acquire the second display interface of the component from the terminal locally according to the first display instruction, and in this case, display information of one or more second display interfaces of the component is stored in the terminal locally, and a corresponding second display interface is acquired according to the number of times that the first display instruction is received; and the second processing module may also acquire the second display interface of the component by using the network and according to the first display instruction, and in this case, one or more second display interfaces of the component are stored in a server at a network side, the terminal sends an acquiring instruction to the server, the server sends a search result to the terminal, and then the terminal displays the search result. A specific acquiring manner may be implemented by using some approaches, which is not described in detail again in this embodiment.

It should be noted that the acquiring unit in this embodiment is further configured to acquire a second display instruction; and the processing unit is further configured to according to the second display instruction, display the first display interface and hide an interface of the component except the first display interface. In this way, when there is no need to display a more detailed display interface of the component, a size of the component can be changed easily back to an original size by a user, thereby improving interface display utilization and significantly improving user experience.

It should be further noted that the first display instruction and the second display instruction are stored in a display instruction table in memory. The display instruction table is preconfigured in the terminal, and content of the display instruction table may be different according to different operations supported by different touchscreen terminals. In this embodiment, the display instruction table mainly includes a mapping relationship between a display instruction and a display interface, but is not limited thereto.

It is noted herein that, in addition to a specific gesture, a user may use a display instruction such as a function button or a menu to send a display instruction; and any manners that can carry an instruction function is available.

Optionally, the acquiring unit 820 may further include (not shown in the figure) a first setting module, an associating module, and a matching module, where the first setting module is configured to set the first display instruction that is used to display the second display interface of the component, and preset a virtual button on the first display interface of the component; the associating module is configured to associate, with the first display instruction, the virtual button set by the first setting module; and the matching module is configured to after external operation information for the virtual button is received, match and extract, by using the association relationship, the first display instruction corresponding to the virtual button.

Optionally, the acquiring unit 820 may further include (not shown in the figure) a second setting module, a detecting module, and a first invoking module, where the second setting module is configured to set the first display instruction that is used to display the second display interface of the component; the detecting module is configured to detect whether there is an external trigger signal on the terminal screen corresponding to the first display interface of the component, and notify the first invoking module of a detecting result; and the first invoking module is configured to receive the detecting result of the detecting module, and when there are multiple external trigger signals within a preset time on the terminal screen corresponding to the first display interface of the component, invoke the first display instruction.

Optionally, the acquiring unit 820 may further include (not shown in the figure) a third setting module, a collecting module, and a second invoking module, where the third setting module is configured to set the first display instruction that is used to display information of the second display interface of the component; the collecting module is configured to collect an external trigger signal of the terminal screen and notify the second invoking module of a collecting result; and the second invoking module is configured to receive the collecting result of the collecting module, determine, according to the collecting result, whether the external trigger signal is generated in a preset region of the terminal screen, and if yes, invoke the first display instruction.

It can be seen that, by using the apparatus in the embodiment of the present disclosure, multiple kinds of display interfaces are provided for a component, the multiple kinds of display interfaces of the component are displayed layer by layer by acquiring a display instruction, and interface display utilization is also effectively improved by displaying display interfaces, of different levels of detail, of the component layer by layer. Each display interface that displays the component every time may include display information of a previous interface, which ensures a successive change of displayed application information of the component, so that when a next interface is displayed, a user does not need to view again information that is viewed on a previous interface, thereby improving user experience.

Figure 9:
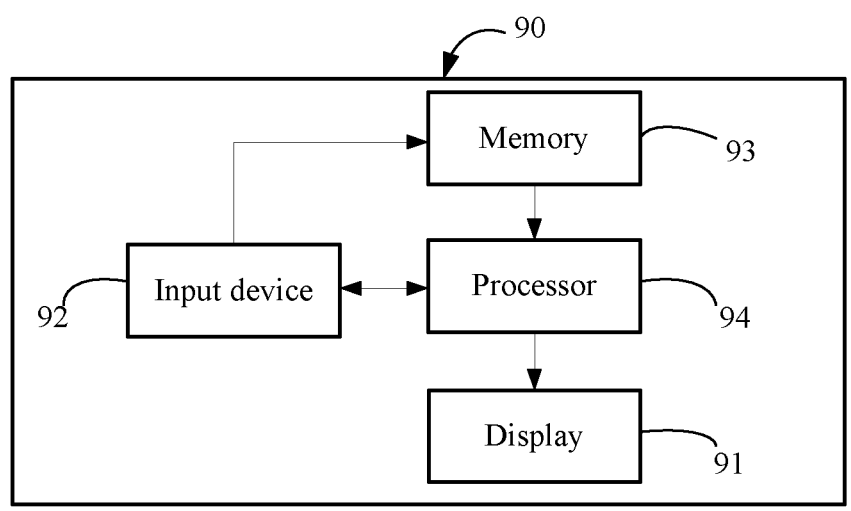
FIG. 9 is a schematic structural diagram of a user equipment for implementing content displaying of a component according to an embodiment of the present disclosure.

It should be noted that another embodiment of the present disclosure further provides a user equipment for implementing content displaying of a component. As shown in FIG. 9, the user equipment 90 at least includes the following apparatuses a display 91, an input device 92, a memory 93, and a processor 94.

The display 91 may be a proper apparatus such as a cathode-ray tube (CRT) display and a liquid crystal display (LCD), and a graphical user interface, such as a clock widget interface, a weather widget interface, and a CPU widget interface, can be presented on a screen of the display.

The input device 92 may include any proper apparatus such as a keyboard, a mouse, a track recognizer, and a speech recognition interface, and is configured to receive an input of a user and send the input to the processor.

In particular, when the user equipment 90 is a touch interactive terminal, an interactive touchscreen may be the screen of the display 91 and may also be the input device 92 at the same time; and specifically, the interactive touchscreen can receive a trigger signal of a terminal touchscreen, and send a matching result to the processor after matching the trigger signal with a display instruction.

In addition, the memory 93 may be a RAM or a ROM, or any fixed storage medium, or any removable storage medium, and is configured to store a program that can execute the embodiment of the present disclosure or to-be-processed data in the embodiment of the present disclosure, for example, store content of a related interface of a component displayed by a terminal home screen.

The processor 94 is configured to execute a program in the embodiment of the present disclosure stored in the memory 93, and communicate with another apparatus in a bidirectional manner through a bus.

The memory 93 and the processor 94 may also be integrated into a physical module that applies the embodiment of the present disclosure, where a program that implements the embodiment of the present disclosure is stored in and runs on the physical module.

In the embodiment of the present disclosure, the units of the apparatus 90 execute the following content separately.

The display 91 is configured to display, on a terminal screen, a first display interface of a component.

The input device 92 is configured to acquire a first display instruction from an external input.

The memory 93 is configured to store the first display instruction that is used to display a second display interface of the component.

The processor 94 is configured to acquire a second display interface of the component according to the first display instruction acquired by the input device 92, and instruct the display 91 to display, on the terminal screen, the second display interface of the component, where the second display interface includes the first display interface. It should be noted that there may be multiple explanations of that the second display interface includes the first display interface. For example, the explanations may be that a display position of the second display interface includes a display position of the first display interface, which may be that the position of the second display interface superposes with the position of the first display interface, for example, the first display interface is displayed at a position 1 of a screen, and the second display interface is displayed at the position 1 and a position 2 of the screen; or the explanations may be that there is an inclusion relationship between display ranges, for example, the first display interface occupies a range of 1*1 on the screen, and the second display interface occupies a range of 2*2 on the screen; or the explanations may be that there is an inclusion relationship between displayed content, for example, content displayed on the second display interface includes content displayed on the first display interface, that is, the content displayed on the first display interface also exists in the content of the second display interface.

Optionally, the processor 94 is further configured to acquire the second display interface of the component from a terminal locally according to the first display instruction, or acquire the second display interface of the component by using a network and according to the first display instruction. It should be noted that the second display interface of the component may be acquired from the terminal locally according to the first display instruction, and in this case, one or more second display interfaces of the component are stored in the terminal locally, and a corresponding second display interface is acquired according to the number of times that the first display instruction is received; or the second display interface of the component may be acquired by using the network and according to the first display instruction, and in this case, display information of one or more second display interfaces of the component is stored in a server at a network side, the terminal sends an acquiring instruction to the server, the server sends a search result to the terminal, and then the terminal displays the search result. A specific acquiring manner may be implemented by using some approaches, which is not described in detail again in this embodiment.

Optionally, the input device 92 is further configured to acquire a second display instruction; and the processor 94 is further configured to instruct, according to the second display instruction, the display 91 to display the first display interface and hide an interface of the component except the first display interface, that is, an original interface of the component may be further displayed according to another received display instruction after the second display interface of the component is displayed. In this way, when there is no need to display a more detailed display interface of the component, a size of the component can be changed easily back to an original size by a user, thereby improving interface display utilization and significantly improving user experience.

It should be further noted that the first display instruction and the second display instruction are stored in a display instruction table in memory. The display instruction table is preconfigured in the terminal, and content of the display instruction table may be different according to different operations supported by different touchscreen terminals. In this embodiment, the display instruction table mainly includes a mapping relationship between a display instruction and a display interface, but is not limited thereto.

It is noted herein that, in addition to a specific gesture, a user may use a display instruction such as a function button or a menu to send a display instruction; and any manner that can carry an instruction function is available.

Optionally, when receiving external operation information for a preset virtual button, the input device 92 sends the operation information to the processor 94, so that the processor 94 can acquire, by using the association relationship, the first display instruction corresponding to the virtual button; or, when detecting that there are multiple external trigger signals within a preset time on the terminal screen corresponding to the first display interface of the component, the input device 92 notifies the processor 94, so that the processor 94 invokes the first display instruction stored in the memory 93 to instruct a subsequent operation; or, when collecting an external trigger signal in a preset region of the terminal screen corresponding to the first display interface of the component, the input device 92 notifies the processor 94, so that the processor 94 invokes the first display instruction stored in the memory 93, to instruct a subsequent operation. Details are not described again in this embodiment.

It can be seen that, by using the user equipment in the embodiment of the present disclosure, multiple kinds of display interfaces are provided for a component, the multiple kinds of display interfaces of the component are displayed layer by layer by acquiring a display instruction, and interface display utilization is also effectively improved by displaying display interfaces, of different levels of detail, of the component layer by layer. In addition, each display interface that displays the component every time may include display information of a previous interface, which ensures a successive change of displayed application information of the component, so that when a next interface is displayed, a user does not need to view again information that is viewed on a previous interface, thereby improving user experience.

It should be noted that, a person skilled in the art can easily understand that the apparatuses implementing a component described in the foregoing embodiments may also be used as a part of all kinds of network terminals or mobile terminals, and are consistent with what is described in the foregoing embodiments from the perspective of implementing content displaying of a component in all kinds of network terminals or mobile terminals. Therefore, a terminal that includes the apparatus for implementing content displaying of a component in the foregoing embodiments shall fall within the protection scope of this application, which is not described in detail again herein.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present disclosure.

In combination with the embodiments disclosed in this specification, method or algorithm steps may be implemented by hardware, a software module executed by a processor, or a combination thereof.

For the foregoing descriptions of the disclosed embodiments, a person skilled in the art can implement or use the embodiments of the present disclosure. Various modifications to the embodiments are obvious to a person skilled in the art, and general principles defined in this specification may be implemented in other embodiments without departing from the spirit or scope of the embodiments of the present disclosure. Therefore, the embodiments of the present disclosure will not be limited to the embodiments described in this specification but meet the widest scope that is consistent with the principles and novelty disclosed in this specification.

The foregoing descriptions are merely exemplary embodiments of the present disclosure, but are not intended to limit the embodiments of the present disclosure. Any modification, equivalent replacement, and improvement made without departing from the spirit and principle of the embodiments of the present disclosure shall fall within the protection scope of the embodiments of the present disclosure.

What is claimed is:

1. A terminal, comprising:
a terminal screen comprising a touch-sensitive surface and a screen;
a memory comprising instructions; and
one or more processors coupled to the terminal screen and the memory and configured to execute the instructions to:
display an icon corresponding to an application program, wherein the icon occupies a first area enclosed by a first outer border, and wherein the first area comprises a first portion of a home screen;
detect a first gesture on the icon;
display, in response to the first gesture, a first interface of a widget corresponding to the application program, wherein the first interface occupies a second area enclosed by a second outer border, wherein the second area comprises a second portion of the home screen, wherein the second area is larger than the first area, wherein the second portion of the home screen comprises the first portion of the home screen and a first additional portion of the home screen, and wherein the second area comprises first information and second information;
display, in response to a second gesture, a second interface of the widget corresponding to the application program, wherein the second interface occupies a third area enclosed by a third outer border, wherein the third area comprises a third portion of the home screen, wherein the third area is larger than the second area, wherein the third portion of the home screen comprises the first portion of the home screen, the first additional portion of the home screen, and a second additional portion of the home screen, and wherein the third area comprises the first information, the second information, and first sub-information corresponding to the first information; and
display, in response to a third gesture, a third interface of the widget corresponding to the application program, wherein the third interface occupies a fourth area enclosed by a fourth outer border, wherein the fourth area comprises a fourth portion of the home screen, wherein the fourth area is larger than the third area, wherein the fourth portion of the home screen comprises the first portion of the home screen, the first additional portion of the home screen, the second additional portion of the home screen, and a third additional portion of the home screen, and wherein the fourth area comprises the first information, the second information, the first sub-information corresponding to the first information, and second sub-information corresponding to the first sub-information.

2. The terminal of claim 1, wherein the one or more processors are further configured to execute the instructions to acquire, in response to the first gesture, the first information from a network.

3. The terminal of claim 1, wherein the application program comprises a music application program, a new application program, or a weather application program.

4. The terminal of claim 1, wherein the first information is associated with a first topic, wherein the second information is associated with a second topic, and wherein the first sub-information and the second sub-information provide additional information about the first topic.

5. A terminal, comprising:
one or more processors; and
a memory coupled to the one or more processors and configured to store an instruction that, when executed by the one or more processors, causes the terminal to be configured to:

display a first interface of a widget corresponding to an application program, wherein the first interface occupies a first area enclosed by a first outer border, wherein the first area comprises a first portion of a home screen, and wherein the first area comprises first information and second information;

detect a first gesture for the widget while the first interface is displayed;

display, in response to the first gesture, a second interface of the widget, wherein the second interface occupies a second area enclosed by a second outer border, wherein the second area comprises a second portion of the home screen, wherein the second area is larger than the first area, wherein the second portion of the home screen comprises the first portion of the home screen and a first additional portion of the home screen, and wherein the second area comprises the first information, the second information, and first sub-information corresponding to the first information; and display, in response to a second gesture, a third interface of the widget, wherein the third interface comprises a third area enclosed by a third outer border, wherein the third area comprises a third portion of the home screen, wherein the third area is larger than the second area, wherein the third portion of the home screen comprises the first portion of the home screen, the first additional portion of the home screen, and a second additional portion of the home screen, and wherein the third area comprises the first information, the second information, the first sub-information corresponding to the first information, and second sub-information corresponding to the first sub-information.

6. The terminal of claim 5, wherein before displaying the first interface, the instruction further causes the terminal to be configured to:

detect a third gesture on an icon of the application program; and display, in response to the third gesture, the first interface.

7. The terminal of claim 5, wherein the instruction further causes the terminal to be configured to acquire the first information and the second information from a network.

8. The terminal of claim 5, wherein the application program comprises a music application program, a new application program, or a weather application program.

9. The terminal of claim 5, further comprising a touchscreen, wherein the instruction further causes the terminal to be configured to receive the first gesture from the touchscreen.

10. The terminal of claim 5, wherein the application program is a weather application program, wherein the first information comprises a temperature or a date, and wherein the second information comprises index information corresponding to the date.

11. The terminal of claim 5, wherein the application program is a news application program, wherein the first information comprises a headline of news, and wherein the second information comprises a summary of the news.

12. The terminal of claim 5, wherein the first information is associated with a first topic, wherein the second information is associated with a second topic, and wherein the first sub-information and the second sub-information provide additional information about the first topic.

13. A method, comprising:

displaying a first interface of a widget corresponding to an application program, wherein the first interface occupies a first area enclosed by a first outer border, wherein the first area comprises a first portion of a home screen, and wherein the first area comprises first information and second information;

detecting a first gesture for the widget while the first interface is displayed;

displaying, in response to the first gesture, a second interface of the widget, wherein the second interface occupies a second area enclosed by a second outer border, wherein the second area comprises a second portion of the home screen, wherein the second area is larger than the first area, wherein the second portion of the home screen comprises the first portion of the home screen and a first additional portion of the home screen, and wherein the second area comprises the first information, the second information, and first sub-information corresponding to the first information; and displaying, in response to a second gesture, a third interface of the widget, wherein the third interface occupies a third area enclosed by a third outer border, wherein the third area comprises a third portion of the home screen, wherein the third area is larger than the second area, wherein the third portion of the home screen comprises the first portion of the home screen, the first additional portion of the home screen, and a second additional portion of the home screen, and wherein the third area comprises the first information, the second information, the first sub-information corresponding to the first information, and second sub-information corresponding to the second information.

14. The method of claim 13, further comprising acquiring the first information and the second information from a network.

15. The method of claim 13, wherein the application program comprises a music application program, a new application program, or a weather application program.

16. The method of claim 13, further comprising receiving the first gesture from a touchscreen of a terminal.

17. The method of claim 13, wherein the application program is a weather application program, and wherein the first information comprises a temperature.

18. The method of claim 13, wherein the application program is a weather application program, wherein the first information comprises a date, and wherein the second information comprises index information corresponding to the date.

19. The method of claim 13, wherein the application program is a news application program, wherein the first information comprises a headline of news, and wherein the second information comprises a summary of the news.

20. The method of claim 13, wherein the first information is associated with a first topic, wherein the second information is associated with a second topic, and wherein the first sub-information and the second sub-information provide additional information about the first topic.

\* \* \* \* \*

UNITED STATES PATENT AND TRADEMARK OFFICE
CERTIFICATE OF CORRECTION

| | | |
|---|---|---|
| PATENT NO. | : 11,797,251 B2 | Page 1 of 1 |
| APPLICATION NO. | : 17/834401 | |
| DATED | : October 24, 2023 | |
| INVENTOR(S) | : Jianxin Ding and Liping Hu | |

It is certified that error appears in the above-identified patent and that said Letters Patent is hereby corrected as shown below:

On the Title Page

Item (71) Applicant: "Huawei Device Co., Ltd., Guangdong (CN)" should read "Huawei Device Co., Ltd., Dongguan (CN)"

Signed and Sealed this
Second Day of January, 2024

Katherine Kelly Vidal
*Director of the United States Patent and Trademark Office*